United States Patent
Hou et al.

(10) Patent No.: US 11,994,992 B2
(45) Date of Patent: May 28, 2024

(54) TAKEOVER METHOD AND APPARATUS FOR CACHE PARTITION RECOVERY, DEVICE AND READABLE MEDIUM

(71) Applicant: SHANDONG YINGXIN COMPUTER TECHNOLOGIES CO., LTD., Shandong (CN)

(72) Inventors: Hongsheng Hou, Shandong (CN); Wenzhi Liu, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 18/271,779

(22) PCT Filed: Apr. 29, 2022

(86) PCT No.: PCT/CN2022/090127
§ 371 (c)(1),
(2) Date: Jul. 11, 2023

(87) PCT Pub. No.: WO2022/247583
PCT Pub. Date: Dec. 1, 2022

(65) Prior Publication Data
US 2023/0393985 A1 Dec. 7, 2023

(30) Foreign Application Priority Data
May 23, 2021 (CN) .......................... 202110561696.5

(51) Int. Cl.
*G06F 12/0846* (2016.01)
*G06F 3/06* (2006.01)
*G06F 11/20* (2006.01)

(52) U.S. Cl.
CPC ........ *G06F 12/0848* (2013.01); *G06F 3/0629* (2013.01); *G06F 11/2089* (2013.01)

(58) Field of Classification Search
None
See application file for complete search history.

(56) References Cited

U.S. PATENT DOCUMENTS 8,645,635 B2 * 2/2014 Bartlett ............... G06F 11/2089
711/158
9,760,458 B2 9/2017 Keremane et al.
(Continued)

FOREIGN PATENT DOCUMENTS

| CN | 104461777 A | 3/2015 |
|---|---|---|
| CN | 106506625 A | 3/2017 |

(Continued)

OTHER PUBLICATIONS

International Search Report for PCT/CN2022/090127 dated Jun. 28, 2022 (5 pages including English Translation).
(Continued)

*Primary Examiner* — Yaima Rigol
(74) *Attorney, Agent, or Firm* — Merchant & Gould P.C.

(57) ABSTRACT

Provided is a takeover method for cache partition recovery, including: determining whether a cluster has a four-controller topology, and when having the four-controller topology, setting a four-controller topology flag for each cache partition of the cluster; in response to monitoring that the cluster is changed to a cluster having a dual-controller topology and including a first node and a second node, determining whether a third node and a fourth node that exit the cluster belong to a same sub-cluster, and when belonging to the same sub-cluster, further determining whether cache partitions of the sub-cluster are set with the four-controller topology flag; and when set with the four-controller topology flag, further determining whether the sub-cluster is in a single-partition mode or dual-partition mode, and respectively taking over, by the first node and the second node, the (Continued)

third node and the fourth node based on the single-partition mode or dual-partition mode.

20 Claims, 2 Drawing Sheets

(56) References Cited

U.S. PATENT DOCUMENTS

| | | | |
|---|---|---|---|
| 9,990,262 B2 | 6/2018 | Keremane et al. | |
| 2014/0126421 A1* | 5/2014 | Lida | H04L 41/12 370/254 |
| 2016/0196078 A1* | 7/2016 | Preston | G06F 3/0689 711/114 |
| 2016/0357648 A1 | 12/2016 | Keremane et al. | |
| 2018/0011769 A1 | 1/2018 | Keramane et al. | |
| 2020/0183622 A1* | 6/2020 | Hubbard | G06F 3/0625 |

FOREIGN PATENT DOCUMENTS

| | | |
|---|---|---|
| CN | 107924354 A | 4/2018 |
| CN | 110413611 A | 11/2019 |
| CN | 112000286 A | 11/2020 |
| CN | 112162698 A | 1/2021 |
| CN | 112463380 A | 3/2021 |
| CN | 113448512 A | 9/2021 |
| WO | 2022247583 A | 12/2022 |

OTHER PUBLICATIONS

Written Opinion for PCT/CN2022/090127 dated Jun. 28, 2022 (4 pages).
Chinese Search Report for Application No. 2021105616965 dated May 22, 2022 (2 pages).

* cited by examiner

TAKEOVER METHOD AND APPARATUS FOR CACHE PARTITION RECOVERY, DEVICE AND READABLE MEDIUM

CROSS-REFERENCE TO RELATED APPLICATION

The present application is a National Stage Filing of PCT International Application No. PCT/CN2022/090127 filed on Apr. 29, 2022, which claims priority to Chinese Patent Application 202110561696.5, filed before the China National Intellectual Property Administration on May 23, 2021, and entitled "Takeover Method and Apparatus for Cache Partition Recovery, Device and Readable Medium", the entire contents of which are herein incorporated by reference.

TECHNICAL FIELD

The present disclosure relates to the technical field of storage, and in particular to a takeover method and apparatus for cache partition recovery, a device and a readable medium.

BACKGROUND

With the development of storage technologies, some application scenarios propose higher requirements for the reliability of a storage device, and when a controller of the storage device fails, the continuity of an I/O needs to be ensured to maintain the service continuity.

In order to improve the data read-write performance, a storage controller is provided with a read-write cache. In dual-controller architecture provided in the related art, the caches of two storage controllers may perform backup for each other, so as to ensure that cached data is not lost when one of the storage controllers fails. However, a storage device based on the dual-controller architecture in the related art has a certain limitation: when one storage controller fails, the storage device will lose half of the performance, and when the two storage controllers both fail, the service of the storage device is interrupted.

Therefore, storage devices based on four-controller architecture appear in recent years, so as to provide higher reliability and security. A four-controller topology is usually divided into two sub-clusters, and each sub-cluster is composed of two storage controllers. In the four-controller topology, cache partitions are respectively established on the two sub-clusters. Since the caches of the four storage controllers perform mutual backup, a cache partition established on the other sub-cluster may be normally deleted on a sub-cluster where a configuration node is located. If the four storage controllers are split into two dual-controllers due to manual or other reasons, the information of the cache partition on the other sub-cluster is stored on the sub-cluster where the configuration node is located, when the configuration node deletes such a cache partition, it is prompted that there is no such a cache partition, this is because when the cluster topology changes, the cache partition which originally belongs to the other sub-cluster is not processed on the sub-cluster where the configuration node is located. The failure in normally deleting a cache partition may result in a decrease in the acceleration function of the cache partition, thereby reducing the overall efficiency of the system.

SUMMARY

In view of the above problem, the embodiments of the present disclosure provide a takeover method and apparatus for cache partition recovery, a device and a readable medium. When a four-controller topology is split into two dual-controller topologies, a sub-cluster left in a cluster takes over a cache partition on a sub-cluster exiting the cluster, thereby ensuring that the cache partitions are not lost, and the cache partition may be normally deleted, thereby ensuring the normal use of an acceleration function of the cache partition.

In one aspect of the embodiments of the present disclosure, provided is a takeover method for cache partition recovery, including the following operations: determining whether a cluster has a four-controller topology, and in response to determining that the cluster has the four-controller topology, setting a four-controller topology flag for each cache partition of the cluster; in response to monitoring that the cluster is changed to a cluster having a dual-controller topology and including a first node and a second node, determining whether a third node and a fourth node that exit the cluster belong to a same sub-cluster, and in response to determining that the third node and the fourth node belong to the same sub-cluster, further determining whether cache partitions of the sub-cluster are set with the four-controller topology flag; and in response to determining that the cache partitions of the sub-cluster are set with the four-controller topology flag, further determining whether the sub-cluster is in a single-partition mode or a dual-partition mode, and respectively taking over, by the first node and the second node, the third node and the fourth node based on the single-partition mode or the dual-partition mode.

In some embodiments, further determining whether the sub-cluster is in the single-partition mode or the dual-partition mode includes: further determining whether the cache partitions of the third node and the fourth node in the sub-cluster are single cache partitions or sub-partitions of cache partitions; in response to determining that the cache partitions of the third node and the fourth node in the sub-cluster are single cache partitions, determining that the sub-cluster is in the single-partition mode; and in response to determining that the cache partitions of the third node and the fourth node in the sub-cluster are sub-partitions of cache partitions, determining that the sub-cluster is in the double-partition mode.

In some embodiments, respectively taking over, by the first node and the second node, the third node and the fourth node based on the single-partition mode or the dual-partition mode includes: when the sub-cluster is in the single-partition mode, taking over, by the first node, the cache partition of the third node, and taking over, by the second node, the cache partition of the fourth node.

In some embodiments, respectively taking over, by the first node and the second node, the third node and the fourth node based on the single-partition mode or the dual-partition mode includes: when the sub-cluster is in the dual-partition mode, taking over, by the first node, the sub-partition of the third node, and taking over, by the second node, the sub-partition of the fourth node.

In some embodiments, determining whether the cluster has the four-controller topology includes: determining whether the cluster has the four-controller topology according to the number of nodes in the cluster.

In some embodiments, in response to monitoring that the cluster is changed to a cluster having the dual-controller topology and including the first node and the second node, determining whether the third node and the fourth node that exit the cluster belong to the same sub-cluster includes: monitoring the number of nodes in the cluster by a control end; and in response to monitoring that the cluster is changed to a cluster having the dual-controller topology and including the first node and the second node, determining whether the third node and the fourth node that exit the cluster belong to the same sub-cluster.

In some embodiments, determining whether the third node and the fourth node that exit the cluster belong to the same sub-cluster includes: according to bits corresponding to the first node and the second node, determining whether the third node and the fourth node that exit the cluster belong to the same sub-cluster.

In another aspect of the embodiments of the present disclosure, further provided is a takeover apparatus for cache partition recovery, including: a first module, configured to determine whether a cluster has a four-controller topology, and in response to determining that the cluster has the four-controller topology, set a four-controller topology flag for each cache partition of the cluster; a second module configured to, in response to monitoring that the cluster is changed to a cluster having a dual-controller topology and including a first node and a second node, determine whether a third node and a fourth node that exit the cluster belong to a same sub-cluster, and in response to determining that the third node and the fourth node belong to the same sub-cluster, further determine whether cache partitions of the sub-cluster are set with the four-controller topology flag; and a third module configured to, in response to determining that the cache partitions of the sub-cluster are set with the four-controller topology flag, further determine whether the sub-cluster is in a single-partition mode or a dual-partition mode, and respectively take over, by the first node and the second node, the third node and the fourth node based on the single-partition mode or the dual-partition mode.

In still another aspect of the embodiments of the present disclosure, further provided is a computer device, including: at least one processor; and a memory, wherein the memory stores a computer instruction executable on the processor, and when the instruction is executed by the processor, the operations of the implemented method include: determining whether a cluster has a four-controller topology, and in response to determining that the cluster has the four-controller topology, setting a four-controller topology flag for each cache partition of the cluster; in response to monitoring that the cluster is changed to a cluster having a dual-controller topology and including a first node and a second node, determining whether a third node and a fourth node that exit the cluster belong to a same sub-cluster, and in response to determining that the third node and the fourth node belong to the same sub-cluster, further determining whether cache partitions of the sub-cluster are set with the four-controller topology flag; and in response to determining that the cache partitions of the sub-cluster are set with the four-controller topology flag, further determining whether the sub-cluster is in a single-partition mode or a dual-partition mode, and respectively taking over, by the first node and the second node, the third node and the fourth node based on the single-partition mode or the dual-partition mode.

In some embodiments, further determining whether the sub-cluster is in the single-partition mode or the dual-partition mode includes: further determining whether the cache partitions of the third node and the fourth node in the sub-cluster are single cache partitions or sub-partitions of cache partitions; in response to determining that the cache partitions of the third node and the fourth node in the sub-cluster are single cache partitions, determining that the sub-cluster is in the single-partition mode; and in response to determining that the cache partitions of the third node and the fourth node in the sub-cluster are sub-partitions of cache partitions, determining that the sub-cluster is in the double-partition mode.

In some embodiments, respectively taking over, by the first node and the second node, the third node and the fourth node based on the single-partition mode or the dual-partition mode includes: when the sub-cluster is in the single-partition mode, taking over, by the first node, the cache partition of the third node, and taking over, by the second node, the cache partition of the fourth node.

In some embodiments, respectively taking over, by the first node and the second node, the third node and the fourth node based on the single-partition mode or the dual-partition mode includes: when the sub-cluster is in the dual-partition mode, taking over, by the first node, the sub-partition of the third node, and taking over, by the second node, the sub-partition of the fourth node.

In some embodiments, determining whether the cluster has the four-controller topology includes: determining whether the cluster has the four-controller topology according to the number of nodes in the cluster.

In some embodiments, in response to monitoring that the cluster is changed to a cluster having the dual-controller topology and including the first node and the second node, determining whether the third node and the fourth node that exit the cluster belong to the same sub-cluster includes: monitoring the number of nodes in the cluster by a control end; and in response to monitoring that the cluster is changed to a cluster having the dual-controller topology and including the first node and the second node, determining whether the third node and the fourth node that exit the cluster belong to the same sub-cluster.

In some embodiments, determining whether the third node and the fourth node that exit the cluster belong to the same sub-cluster includes: according to bits corresponding to the first node and the second node, determining whether the third node and the fourth node that exit the cluster belong to the same sub-cluster.

In still another aspect of the embodiments of the present disclosure, further provided is a computer-readable storage medium, wherein the computer-readable storage medium stores a computer program which implements the operations of the above method when executed by a processor.

The solution provided in the embodiments of the present disclosure has the following beneficial technical effects: the problem that after the four-controller topology is split into two dual-controller topologies, the sub-cluster left in the cluster cannot delete the cache partitions on the other sub-cluster of the original cluster may be solved. After the four-controller topology is split into the two dual-controller topologies, the sub-cluster left in the cluster takes over the cache partitions on the sub-cluster exiting the cluster, thereby ensuring that the cache partitions are not lost, and the cache partition may be normally deleted, thereby ensuring the normal use of the acceleration function of the cache partition.

BRIEF DESCRIPTION OF THE DRAWINGS

To illustrate technical solutions in the embodiments of the present disclosure or the related art more clearly, a brief introduction on the drawings which are needed in the description of the embodiments or the related art is given below. Apparently, the drawings in the description below are merely some of the embodiments of the present disclosure, based on which other drawings may be obtained by those having ordinary skill in the art without any creative effort.

DETAILED DESCRIPTION

In order to make the objectives, technical solutions and advantages of the present disclosure more clearly understood, the embodiments of the present disclosure are further described in detail below in combination with exemplary embodiments and with reference to the drawings.

It should be noted that, all expressions using "first" and "second" in the embodiments of the present disclosure are used to distinguish two different entities with the same name or different parameters, therefore "first" and "second" are only for the convenience of expression, and should not be construed as limitations to the embodiments of the present disclosure, which will not be repeatedly illustrated in subsequent embodiments.

Figure 1:
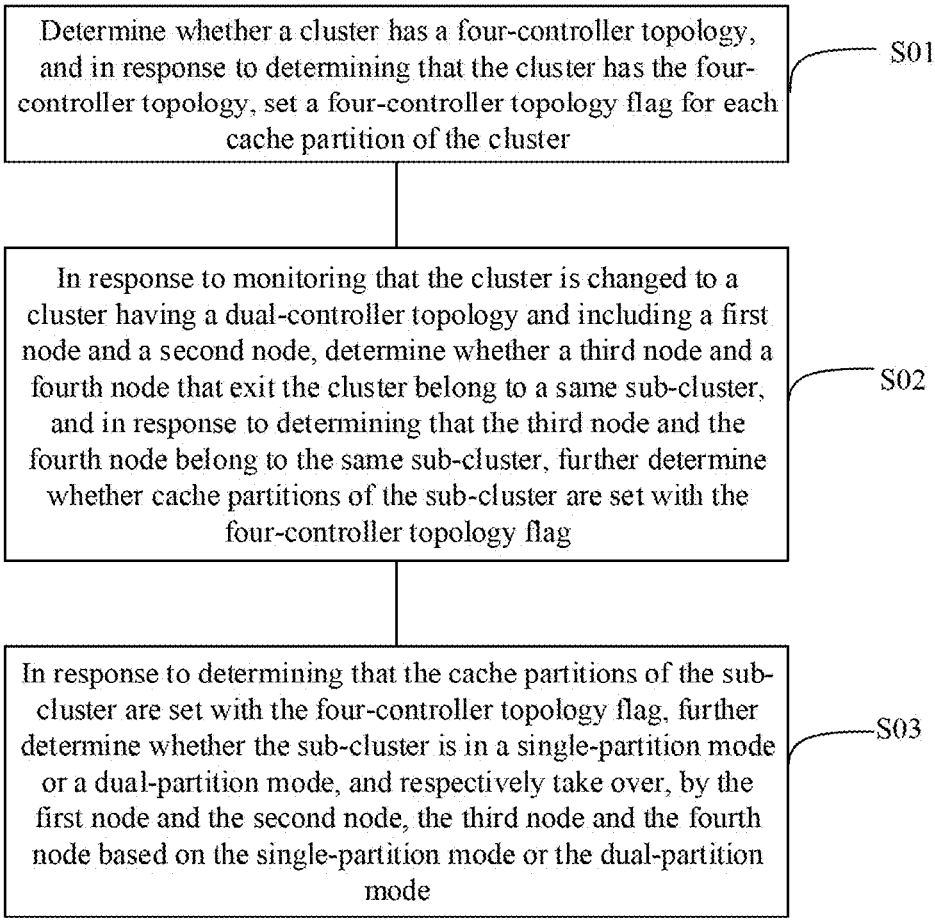
FIG. 1 is a schematic diagram of an embodiment of a takeover method for cache partition recovery provided in the present disclosure.

In a first aspect of the embodiments of the present disclosure, an embodiment of a takeover method for cache partition recovery is provided. FIG. 1 shows a schematic diagram of an embodiment of a takeover method for cache partition recovery provided in the present disclosure. As shown in FIG. 1, the embodiment of the present disclosure includes the following operations S01 to S03.

At S01, whether a cluster has a four-controller topology is determined, and in response to determining that the cluster has the four-controller topology, a four-controller topology flag is set for each cache partition of the cluster.

At S02, in response to monitoring that the cluster is changed to a cluster having a dual-controller topology and including a first node and a second node, whether a third node and a fourth node that exit the cluster belong to a same sub-cluster is determined, and in response to determining that the third node and the fourth node belong to the same sub-cluster, whether cache partitions of the sub-cluster are set with the four-controller topology flag is further determined.

At S03, in response to determining that the cache partitions of the sub-cluster are set with the four-controller topology flag, whether the sub-cluster is in a single-partition mode or a dual-partition mode is further determined, and the first node and the second node respectively take over the third node and the fourth node based on the single-partition mode or the dual-partition mode.

In the present embodiment, first, the four-controller topology is split into two dual-controller topologies, and then the cluster determines whether the two nodes exiting the cluster belong to the same sub-cluster; and finally, the two nodes on the sub-cluster that does not exit the cluster take over the cache partitions of the two nodes on the sub-cluster that exits the cluster, and the sub-clusters are divided into the single-partition mode and the dual-partition mode for adaptation. The problem that after the four-controller topology is split into the two dual-controller topologies, the sub-cluster left in the cluster cannot delete cache partitions which previously belong to the other sub-cluster may be solved, and the normal use of an acceleration function of an SSD cache partition may be ensured.

In the present embodiment, the takeover method for Solid-State Drive (SSD) cache partition recovery after a cluster topology changes includes: when a cache partition is created, the cluster topology is determined according to the number of nodes in the cluster, and when the cluster topology is a four-controller topology, a flag for indicating the four-controller topology is added for the cache partition. When the four-controller topology is split into two dual-controller topologies due to manual or other reasons, a control end senses the change in the number of nodes in the cluster, and triggers a cache partition takeover process by means of a state machine.

According to bits corresponding to the nodes in the cluster, it is determined whether the nodes exiting the cluster belong to the same iogroup (sub-cluster), and when both nodes of one sub-cluster exit the cluster at the same time, a takeover process for the cache partitions on the sub-cluster is newly introduced. The implementation method of the takeover process includes: whether the cache partition is set with a flag for indicating the four-controller topology is determined, and when the cache partition is set with the flag for indicating the four-controller topology, adaptive takeover processes are respectively carried out according two situations, that is, a single-partition mode and a dual-partition mode.

In some embodiments of the present disclosure, whether the sub-cluster is in the single-partition mode or the dual-partition mode may be further determined in the following manner: whether the cache partitions of the third node and the fourth node in the sub-cluster are single cache partitions or sub-partitions of cache partitions is further determined; in response to determining that the cache partitions of the third node and the fourth node in the sub-cluster are single cache partitions, it is determined that the sub-cluster is in the single-partition mode; and in response to determining that the cache partitions of the third node and the fourth node in the sub-cluster are sub-partitions of cache partitions, it is determined that the sub-cluster is in the double-partition mode.

In some embodiments of the present disclosure, the first node and the second node may respectively take over the third node and the fourth node based on the single-partition mode or the dual-partition mode in the following manner when the sub-cluster is in the single-partition mode, the first node takes over the cache partition of the third node, and the second node takes over the cache partition of the fourth node.

In the present embodiment, in a single-partition scenario, takeover is performed according to the index of the node, the node indexes of four nodes of the four-controller topology are respectively a first node node0, a second node node1, a third node node2 and a fourth node node3, the first node node0 and the second node node1 form a first sub-cluster iogroup0, and the third node node2 and the fourth node node3 form a second sub-cluster iogroup1. Assuming that the two nodes on the second sub-cluster iogroup1 simultaneously exit the cluster and no longer re-join the cluster, the first node node0 in the two nodes on the first sub-cluster iogroup0 takes over a single partition on the third node node2, and the second node node1 takes over a single partition on the fourth node node3. It is taken as an example that the first node node0 takes over the single partition on the third node node2, the belongnode of the single partition on the third node node2 is modified into the first node node0, the control end sends a takeover task to an agent end (a management end), and the management end recreates, on the first node node0 according to the belongnode, the cache partition which originally belongs to the third node node2.

In some embodiments of the present disclosure, the first node and the second node may respectively take over the third node and the fourth node based on the single-partition mode or the dual-partition mode in the following manner: when the sub-cluster is in the dual-partition mode, the first node takes over the sub-partition of the third node, and the second node takes over the sub-partition of the fourth node.

In the present embodiment, in a dual-partition scenario, the third node node2 and the fourth node node3 have sub-partitions of cache partitions, and the first node node0 and the second node node1 need to respectively take over the corresponding sub-partitions. Since the cache partition in the dual-partition mode only retains one copy of information data at the control end, the cache partition is only distinguished at the management end, the belongnode of the cache partition on the third node node2 is modified into the first node node0, the control end transmits, to the management end, a flag bit for indicating that the partition is in the dual-partition mode, and the management end respectively creates a sub-partition on the first node node0 and the second node node1 according to the belongnode and the flag indicating the double-partition mode.

In some embodiments of the present disclosure, whether the cluster has the four-controller topology may be determined in the following manner: whether the cluster has the four-controller topology is determined according to the number of nodes in the cluster.

In some embodiments of the present disclosure, in response to monitoring that the cluster is changed to a cluster having the dual-controller topology and including the first node and the second node, whether the third node and the fourth node that exit the cluster belong to the same sub-cluster may be determined in the following manner: the number of nodes in the cluster is monitored by the control end; and in response to monitoring that the cluster is changed to a cluster having the dual-controller topology and including the first node and the second node, whether the third node and the fourth node that exit the cluster belong to the same sub-cluster is determined.

In some embodiments of the present disclosure, whether the third node and the fourth node that exit the cluster belong to the same sub-cluster may be determined in the following manner: according to bits corresponding to the first node and the second node, whether the third node and the fourth node that exit the cluster belong to the same sub-cluster is determined.

In some embodiments of the present disclosure, the method may be applied to, but is not limited to, a Linux system.

It should be particularly pointed out that, various operations in various embodiments of the takeover method for cache partition recovery may be intersected, replaced, added and reduced, therefore these reasonable permutation and combination changes to the takeover method for cache partition recovery should also fall within the protection scope of the present disclosure, and the protection scope of the present disclosure should not be limited to the embodiments.

Figure 2:
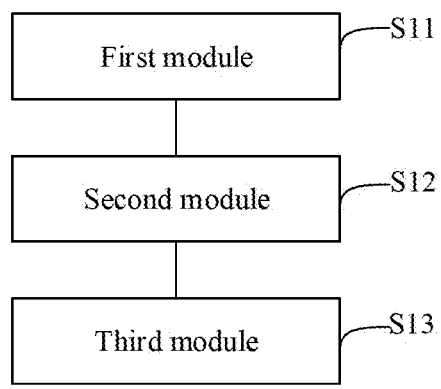
FIG. 2 is a schematic diagram of an embodiment of a takeover apparatus for cache partition recovery provided in the present disclosure.

In a second aspect of the embodiments of the present disclosure, a takeover apparatus for cache partition recovery is provided. FIG. 2 shows a schematic diagram of an embodiment of a takeover apparatus for cache partition recovery provided in the present disclosure. As shown in FIG. 2, the embodiment of the present disclosure includes the following modules: a first module S11, configured to determine whether a cluster has a four-controller topology, and in response to determining that the cluster has the four-controller topology, set a four-controller topology flag for each cache partition of the cluster; a second module S12 configured to, in response to monitoring that the cluster is changed to a cluster having a dual-controller topology and including a first node and a second node, determine whether a third node and a fourth node that exit the cluster belong to a same sub-cluster, and in response to determining that the third node and the fourth node belong to the same sub-cluster, further determine whether cache partitions of the sub-cluster are set with the four-controller topology flag; and a third module S13 configured to, in response to determining that the cache partitions of the sub-cluster are set with the four-controller topology flag, further determine whether the sub-cluster is in a single-partition mode or a dual-partition mode, and respectively take over, by the first node and the second node, the third node and the fourth node based on the single-partition mode or the dual-partition mode.

Figure 3:
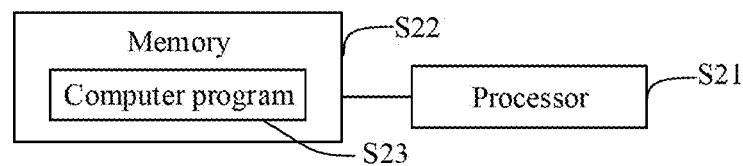
FIG. 3 is a schematic diagram of an embodiment of a computer device provided in the present disclosure.

In a third aspect of the embodiments of this application, a computer device is provided. FIG. 3 shows a schematic diagram of an embodiment of a computer device provided in the present disclosure. As shown in FIG. 3, the embodiment of the present disclosure includes the following apparatuses: at least one processor S21; and a memory S22, wherein the memory S22 stores a computer instruction S23 which is executable on the processor, and when the instruction is executed by the processor, the operations of the implemented method include: determining whether a cluster has a four-controller topology, and in response to determining that the cluster has the four-controller topology, setting a four-controller topology flag for each cache partition of the cluster; in response to monitoring that the cluster is changed to a cluster having a dual-controller topology and including a first node and a second node, determining whether a third node and a fourth node that exit the cluster belong to a same sub-cluster, and in response to determining that the third node and the fourth node belong to the same sub-cluster, further determining whether cache partitions of the sub-cluster are set with the four-controller topology flag; and in response to determining that the cache partitions of the sub-cluster are set with the four-controller topology flag, further determining whether the sub-cluster is in a single-partition mode or a dual-partition mode, and respectively taking over, by the first node and the second node, the third node and the fourth node based on the single-partition mode or the dual-partition mode.

In some embodiments, further determining whether the sub-cluster is in the single-partition mode or the dual-partition mode includes: further determining whether the cache partitions of the third node and the fourth node in the sub-cluster are single cache partitions or sub-partitions of cache partitions; in response to determining that the cache partitions of the third node and the fourth node in the sub-cluster are single cache partitions, determining that the sub-cluster is in the single-partition mode; and in response to determining that the cache partitions of the third node and the fourth node in the sub-cluster are sub-partitions of cache partitions, determining that the sub-cluster is in the double-partition mode.

In some embodiments, respectively taking over, by the first node and the second node, the third node and the fourth node based on the single-partition mode or the dual-partition mode includes: when the sub-cluster is in the single-partition mode, taking over, by the first node, the cache partition of the third node, and taking over, by the second node, the cache partition of the fourth node.

In some embodiments, respectively taking over, by the first node and the second node, the third node and the fourth node based on the single-partition mode or the dual-partition mode includes: when the sub-cluster is in the dual-partition mode, taking over, by the first node, the sub-partition of the third node, and taking over, by the second node, the sub-partition of the fourth node.

In some embodiments, determining whether the cluster has the four-controller topology includes: determining whether the cluster has the four-controller topology according to the number of nodes in the cluster.

In some embodiments, in response to monitoring that the cluster is changed to a cluster having the dual-controller topology and including the first node and the second node, determining whether the third node and the fourth node that exit the cluster belong to the same sub-cluster includes: monitoring the number of nodes in the cluster by a control end; and in response to monitoring that the cluster is changed to a cluster having the dual-controller topology and including the first node and the second node, determining whether the third node and the fourth node that exit the cluster belong to the same sub-cluster.

In some embodiments, determining whether the third node and the fourth node that exit the cluster belong to the same sub-cluster includes: according to bits corresponding to the first node and the second node, determining whether the third node and the fourth node that exit the cluster belong to the same sub-cluster.

Figure 4:
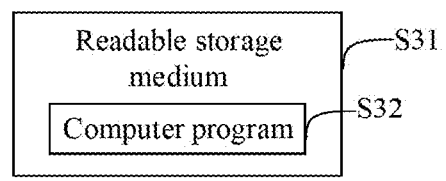
FIG. 4 is a schematic diagram of an embodiment of a computer-readable storage medium provided in the present disclosure.

The embodiments of the present disclosure further provide a computer-readable storage medium. FIG. 4 shows a schematic diagram of an embodiment of a computer-readable storage medium provided in the present disclosure. As shown in FIG. 4, the computer readable storage medium S31 stores a computer program S32 which implements the operations of the above method when executed by a processor.

It should be noted that, those having ordinary skill in the art may understand that all or some processes in the method in the above embodiments may be implemented by using a computer program to instruct related hardware, a program of the takeover method for cache partition recovery may be stored in a computer-readable storage medium, and when executed, the program may include the processes of the embodiments of the foregoing methods. The storage medium of the program may be a magnetic disc, an optical disc, a Read-Only Memory (ROM), or a Random Access Memory (RAM), and the like. The embodiments of the above computer program may achieve the same or similar effects as any of the foregoing method embodiments corresponding thereto.

In addition, the method disclosed according to the embodiments of the present disclosure may also be implemented as a computer program which is executed by a processor, and the computer program may be stored in a computer-readable storage medium. When executed by a processor, the computer program executes the above functions which are defined in the method disclosed in the embodiments of the present disclosure.

In addition, the operations of the above method and system units may also be implemented by using a controller and a computer-readable storage medium for storing a computer program, which causes the controller to implement the above operations or unit functions.

Those having ordinary skill in the art should also understand that, various exemplary logical blocks, modules, circuits and algorithm operations described in combination with the disclosure herein may be implemented as electronic hardware, computer software or a combination of the two. In order to clearly illustrate this interchangeability of hardware and software, the functions of various illustrative components, blocks, modules, circuits and operations have been generally described. Whether such functions are implemented as software or hardware depends on practical applications and design constraints imposed on the entire system. Those having ordinary skill in the art may implement the functions in various manners for each practical application, but such implementation decision should not be interpreted as departing from the scope disclosed in the embodiments of the present disclosure.

In one or more exemplary designs, the functions may be implemented in hardware, software, firmware or any combination thereof. If implemented in software, the functions may be stored as one or more instructions or codes on a computer-readable medium or transmitted over the computer-readable medium. The computer-readable medium includes a computer storage medium and a communication medium, and the communication medium includes any medium that facilitates to transfer the computer program from one location to another. The storage medium may be any available medium that may be accessed by a general-purpose or special-purpose computer. By way of example and not limitation, the computer-readable medium may include an RAM, an ROM, an EEPROM, a CD-ROM or other optical disc storage devices, magnetic disc storage devices, or other magnetic storage devices, or any other media, which may be used for carrying or storing required program codes in the form of instructions or data structures, and which be accessed by a general-purpose or special-purpose computer or a general-purpose or special-purpose processor. In addition, any connection may be suitably referred to as the computer-readable medium. For example, if a coaxial cable, an optical fiber cable, a twisted pair, a Digital Subscriber Line (DSL), or a wireless technology such as infrared, radio and microwaves is used for sending software from a website, a server or other remote sources, then the coaxial cable, the optical fiber cable, the twisted pair, the DSL, or the wireless technology such as infrared, radio and microwaves are all included in the definition of the medium. As used herein, the magnetic disc and the optical disc include Compact Discs (CD), laser discs, optical discs, Digital Versatile Discs (DVD), floppy discs, Blue-ray discs, wherein the magnetic disc usually reproduces data magnetically, while the optical disc reproduces data optically by using laser. Combinations of the above content should also fall within the scope of the computer-readable medium.

The exemplary embodiments disclosed in the present disclosure are described above, but it should be noted that, various changes and modifications may be made on the premise of not departing from the scope defined by the claims and disclosed in the embodiments of the present disclosure. The functions, operations and/or actions of the method claims according to the disclosed embodiments described herein do not need to be executed in any particular order. In addition, although the elements disclosed in the embodiments of the present disclosure may be described or claimed in an individual form, it can be understood that there are a plurality of elements unless explicitly limited to be singular.

It should be understood that, as used herein, a singular form "a" is intended to include a plural form as well, unless the context clearly supports exceptional cases. It should also be understood that, the term "and/or" as used herein refers to any and all possible combinations which include one or more items listed in association.

The sequence numbers of the embodiments disclosed in the embodiments of the present disclosure are merely for description, and do not represent the advantages and disadvantages of the embodiments.

Those having ordinary skill in the art may understand that all or some operations for implementing the above embodiments may be completed by hardware, and may also be completed by a program instructing related hardware, the program may be stored in a computer-readable storage medium, and the storage medium mentioned above may be a read-only memory, a magnetic disc, an optical disc, or the like.

Those having ordinary skill in the art to which the present disclosure belongs should understand that, the discussion of any of the above embodiments is merely exemplary, and is not intended to imply that the scope (including the claims) disclosed in the embodiments of the present disclosure is limited to these examples; under the idea of the embodiments of the present disclosure, the technical features in the above embodiments or different embodiments may also be combined, and there are many other changes in different aspects of the embodiments of the present disclosure as described above, which are not provided in details for conciseness. Therefore, any omissions, modifications, equivalent replacements, improvements and the like, made within the spirit and principles of the embodiments of the present disclosure, should fall within the protection scope of the embodiments of the present disclosure.

What is claimed is:

1. A takeover method for cache partition recovery, comprising:
   determining whether a cluster has a four-controller topology, and in response to determining that the cluster has the four-controller topology, setting a four-controller topology flag for each cache partition of the cluster;
   in response to monitoring that the cluster is changed to a cluster having a dual-controller topology and comprising a first node and a second node, determining whether a third node and a fourth node that exit the cluster belong to a same sub-cluster, and in response to determining that the third node and the fourth node belong to the same sub-cluster, further determining whether cache partitions of the sub-cluster are set with the four-controller topology flag; and
   in response to determining that the cache partitions of the sub-cluster are set with the four-controller topology flag, further determining whether the sub-cluster is in a single-partition mode or a dual-partition mode, and respectively taking over, by the first node and the second node, the third node and the fourth node based on the single-partition mode or the dual-partition mode.

2. The takeover method for cache partition recovery according to claim 1, wherein further determining whether the sub-cluster is in the single-partition mode or the dual-partition mode comprises:
   further determining whether the cache partitions of the third node and the fourth node in the sub-cluster are single cache partitions or sub-partitions of cache partitions;
   in response to determining that the cache partitions of the third node and the fourth node in the sub-cluster are single cache partitions, determining that the sub-cluster is in the single-partition mode; and
   in response to determining that the cache partitions of the third node and the fourth node in the sub-cluster are sub-partitions of cache partitions, determining that the sub-cluster is in the double-partition mode.

3. The takeover method for cache partition recovery according to claim 1, wherein respectively taking over, by the first node and the second node, the third node and the fourth node based on the single-partition mode or the dual-partition mode comprises:
   when the sub-cluster is in the single-partition mode, taking over, by the first node, the cache partition of the third node, and taking over, by the second node, the cache partition of the fourth node.

4. The takeover method for cache partition recovery according to claim 3, wherein taking over, by the first node, the cache partition of the third node, and taking over, by the second node, the cache partition of the fourth node comprises:
   modifying a belong node of the single cache partition on the third node into the first node, and modifying a belong node of the single cache partition on the fourth node into the second node; sending, by a control end, a takeover task to an agent end; and recreating, on the first node according to the belong node by the agent end, the cache partition which originally belongs to the third node, and recreating, on the second node according to the belong node by the agent end, the cache partition which originally belongs to the fourth node.

5. The takeover method for cache partition recovery according to claim 1, wherein respectively taking over, by the first node and the second node, the third node and the fourth node based on the single-partition mode or the dual-partition mode comprises:
   when the sub-cluster is in the dual-partition mode, taking over, by the first node, the sub-partition of the third node, and taking over, by the second node, the sub-partition of the fourth node.

6. The takeover method for cache partition recovery according to claim 5, wherein taking over, by the first node, the sub-partition of the third node, and taking over, by the second node, the sub-partition of the fourth node comprises:
   modifying a belong node of the cache partition on the third node into the first node, and modifying a belong node of the cache partition on the fourth node into the second node; transmitting, by a control end to an agent end, a flag bit for indicating that the cache partition is in the dual-partition mode; and respectively creating, by the agent end, a sub-partition on the first node and the second node according to the belong node and the flag indicating that the cache partition is in the dual-partition mode.

7. The takeover method for cache partition recovery according to claim 1, wherein determining whether the cluster has the four-controller topology comprises:
   determining whether the cluster has the four-controller topology according to the number of nodes in the cluster.

8. The takeover method for cache partition recovery according to claim 1, wherein in response to monitoring that the cluster is changed to a cluster having the dual-controller topology and comprising the first node and the second node, determining whether the third node and the fourth node that exit the cluster belong to the same sub-cluster comprises:
   monitoring the number of nodes in the cluster by a control end; and
   in response to monitoring that the cluster is changed to a cluster having the dual-controller topology and comprising the first node and the second node, determining whether the third node and the fourth node that exit the cluster belong to the same sub-cluster.

9. The takeover method for cache partition recovery according to claim 1, wherein determining whether the third node and the fourth node that exit the cluster belong to the same sub-cluster comprises:
according to bits corresponding to the first node and the second node, determining whether the third node and the fourth node that exit the cluster belong to the same sub-cluster.

10. The takeover method for cache partition recovery according to claim 1, wherein
monitoring that the cluster is changed to the cluster having the dual-controller topology comprises: monitoring, by a control end, that the cluster is changed to the cluster having the dual-controller topology by sensing change in the number of nodes in the cluster; and
in response to monitoring that the cluster is changed to the cluster having the dual-controller topology, the control end triggers a cache partition takeover process by a state machine.

11. A computer device, comprising:
at least one processor; and
a memory, wherein the memory stores a computer instruction executable on the processor, and the computer instruction, when being executed by the processor, causes the processor to implement following operations:
determining whether a cluster has a four-controller topology, and in response to determining that the cluster has the four-controller topology, setting a four-controller topology flag for each cache partition of the cluster;
in response to monitoring that the cluster is changed to a cluster having a dual-controller topology and comprising a first node and a second node, determining whether a third node and a fourth node that exit the cluster belong to a same sub-cluster, and in response to determining that the third node and the fourth node belong to the same sub-cluster, further determining whether cache partitions of the sub-cluster are set with the four-controller topology flag; and
in response to determining that the cache partitions of the sub-cluster are set with the four-controller topology flag, further determining whether the sub-cluster is in a single-partition mode or a dual-partition mode, and respectively taking over, by the first node and the second node, the third node and the fourth node based on the single-partition mode or the dual-partition mode.

12. The computer device according to claim 11, wherein further determining whether the sub-cluster is in the single-partition mode or the dual-partition mode comprises:
further determining whether the cache partitions of the third node and the fourth node in the sub-cluster are single cache partitions or sub-partitions of cache partitions;
in response to determining that the cache partitions of the third node and the fourth node in the sub-cluster are single cache partitions, determining that the sub-cluster is in the single-partition mode; and
in response to determining that the cache partitions of the third node and the fourth node in the sub-cluster are sub-partitions of cache partitions, determining that the sub-cluster is in the double-partition mode.

13. The computer device according to claim 11, wherein respectively taking over, by the first node and the second node, the third node and the fourth node based on the single-partition mode or the dual-partition mode comprises:
when the sub-cluster is in the single-partition mode, taking over, by the first node, the cache partition of the third node, and taking over, by the second node, the cache partition of the fourth node.

14. The computer device according to claim 13, wherein taking over, by the first node, the cache partition of the third node, and taking over, by the second node, the cache partition of the fourth node comprises:
modifying a belong node of the single cache partition on the third node into the first node, and modifying a belong node of the single cache partition on the fourth node into the second node; sending, by a control end, a takeover task to an agent end; and recreating, on the first node according to the belong node by the agent end, the cache partition which originally belongs to the third node, and recreating, on the second node according to the belong node by the agent end, the cache partition which originally belongs to the fourth node.

15. The computer device according to claim 11, wherein respectively taking over, by the first node and the second node, the third node and the fourth node based on the single-partition mode or the dual-partition mode comprises:
when the sub-cluster is in the dual-partition mode, taking over, by the first node, the sub-partition of the third node, and taking over, by the second node, the sub-partition of the fourth node.

16. The computer device according to claim 15, wherein taking over, by the first node, the sub-partition of the third node, and taking over, by the second node, the sub-partition of the fourth node comprises:
modifying a belong node of the cache partition on the third node into the first node, and modifying a belong node of the cache partition on the fourth node into the second node; transmitting, by a control end to an agent end, a flag bit for indicating that the cache partition is in the dual-partition mode; and respectively creating, by the agent end, a sub-partition on the first node and the second node according to the belong node and the flag indicating that the cache partition is in the dual-partition mode.

17. The computer device according to claim 11, wherein determining whether the cluster has the four-controller topology comprises:
determining whether the cluster has the four-controller topology according to the number of nodes in the cluster.

18. The computer device according to claim 11, wherein in response to monitoring that the cluster is changed to a cluster having the dual-controller topology and comprising the first node and the second node, determining whether the third node and the fourth node that exit the cluster belong to the same sub-cluster comprises:
monitoring the number of nodes in the cluster by a control end; and
in response to monitoring that the cluster is changed to a cluster having the dual-controller topology and comprising the first node and the second node, determining whether the third node and the fourth node that exit the cluster belong to the same sub-cluster.

19. The computer device according to claim 11, wherein determining whether the third node and the fourth node that exit the cluster belong to the same sub-cluster comprises:
according to bits corresponding to the first node and the second node, determining whether the third node and the fourth node that exit the cluster belong to the same sub-cluster.

20. A non-transitory computer-readable storage medium, wherein the non-transitory computer-readable storage medium stores a computer program, and the computer program, when being executed by a processor, causes the processor to implement following operations:
- determining whether a cluster has a four-controller topology, and in response to determining that the cluster has the four-controller topology, setting a four-controller topology flag for each cache partition of the cluster;
- in response to monitoring that the cluster is changed to a cluster having a dual-controller topology and comprising a first node and a second node, determining whether a third node and a fourth node that exit the cluster belong to a same sub-cluster, and in response to determining that the third node and the fourth node belong to the same sub-cluster, further determining whether cache partitions of the sub-cluster are set with the four-controller topology flag; and
- in response to determining that the cache partitions of the sub-cluster are set with the four-controller topology flag, further determining whether the sub-cluster is in a single-partition mode or a dual-partition mode, and respectively taking over, by the first node and the second node, the third node and the fourth node based on the single-partition mode or the dual-partition mode.

* * * * *